March 31, 1936.  V. G. APPLE  2,035,519
OIL SEALED BEARING
Filed Oct. 31, 1932
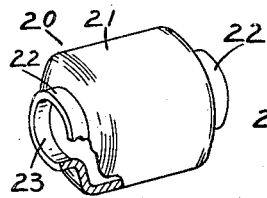
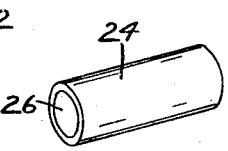
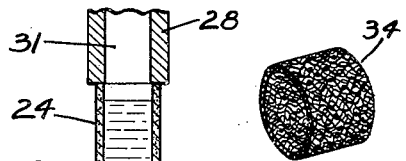
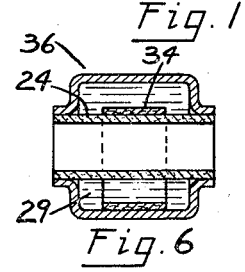
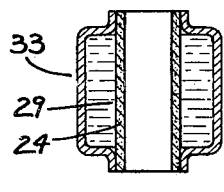
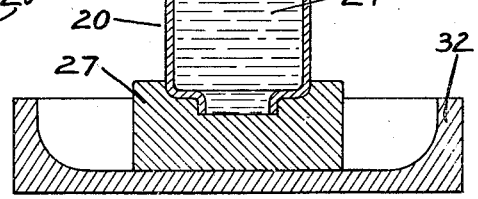
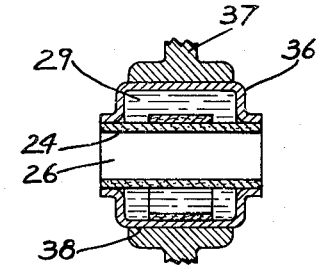
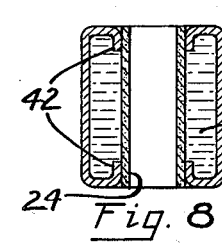
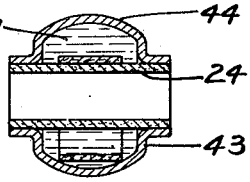
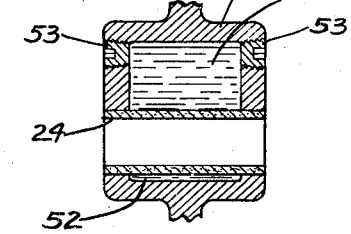
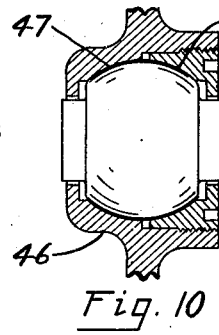
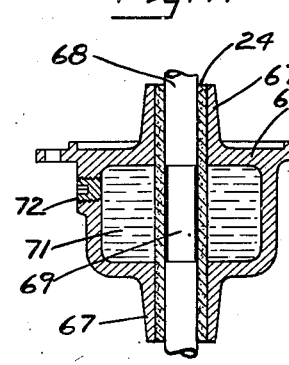
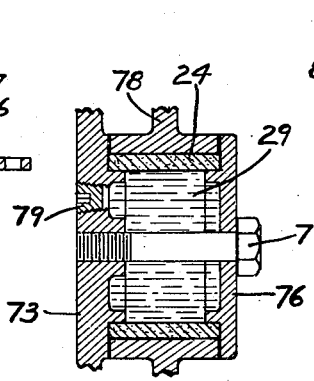
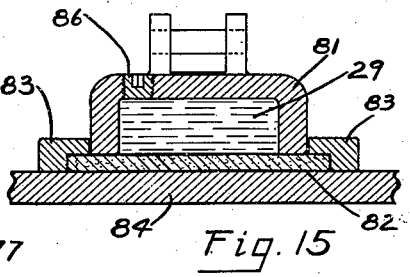
INVENTOR
Vincent G. Apple, deceased,
By Herbert E. Apple, Executor.
by Frederick W. Cotterman
Attorney Patented Mar. 31, 1936

2,035,519

UNITED STATES PATENT OFFICE 2,035,519

OIL SEALED BEARING

Vincent G. Apple, deceased, late of Dayton, Ohio, by Herbert F. Apple, executor, Dayton, Ohio Application October 31, 1932, Serial No. 640,463

1 Claim. (Cl. 308—121)

This invention relates to machine bearings and particularly to that class of machine bearings which are denominated self-lubricating.

An object of the invention is to provide a bearing structure which will operate with a minimum amount of lubricant, to the end that the sum of its initial and operating cost will be kept at a minimum.

Another object is to provide a self-contained bearing structure which will carry sufficient lubricant for the operative life of the bearing or which will at most require replenishing only at extremely long intervals, to the end that the attention to lubrication, ordinarily required in bearing structures, will be eliminated.

Another object is to provide a bearing structure which, though adequately lubricated, will not have the usual accumulation of surplus oil around the journal at the end of the bearing, to the end that the bearing structure may be used in machinery where oil must at all events be kept from the product being made, such as in machinery for mixing food products, or in weaving fine fabrics, etc.

That these and other objects are attained will be readily apparent from a consideration of the following description, when taken in conjunction with the drawing wherein, Fig. 1 is a detail view of a shell comprising a part of one of this improved bearing.

Fig. 2 shows one of the bearing bushings used in this improved structure.

Fig. 3 shows the parts Figs. 1 and 2 in the process of assembly.

Fig. 4 shows the parts Figs. 1 and 2 assembled.

Fig. 5 shows an additional part used when the bearing is to be operated in a horizontal position.

Fig. 6 shows a cross section through an assembled bearing for horizontal use.

Fig. 7 shows the assembly Fig. 6 in the hub of a machine.

Fig. 8 is a cross section through a bearing structure using a modified form of bearing shell.

Fig. 9 shows another bearing structure using a modified form of bearing shell.

Fig. 10 shows how this improved bearing structure Fig. 9 may be mounted to be self-aligning.

Fig. 11 shows a horizontal bearing structure having a cast instead of a drawn shell.

Fig. 12 shows how this improvement may be incorporated in a line shaft bearing of relatively large size.

Fig. 13 shows a small motor head lubricated by the improved method.

Fig. 14 shows a modified form of rotative bearing.

Fig. 15 shows how this improvement may be applied to a cross-head bearing.

Similar numerals refer to similar parts throughout the several views.

As is well known the matter of keeping an ordinary metal-to-metal machine bearing properly lubricated has given rise to considerable difficulty. Where the ordinary oil hole is used into which a shot of oil is injected, the oil quickly works through and out of the ends of the bearing and is lost whereby frequent attention to renewal of the lubricant is imperative. The cost of the lubricant that is wasted during the life of a bearing of this kind is usually more than the cost of the bearing itself, and, besides being lost, the lubricant which escapes from the ends of a bearing usually gets to places where its presence is extremely objectionable, as for example on the commutator of an electric motor where the commutator and brushes are adjacent the end of one of its shaft bearings, or on food where a bearing in a machine for mixing food products is adjacent the food being mixed.

The difficulties encountered with oil hole lubrication of bearings gave rise first to sight feed oiling where a supply of oil carried above the bearing was fed by gravity through an opening, which was manually regulatable by sight and fed directly to the rotating journal. The serious objection to this system was that it required attention to keep it adjusted and further attention to shut it off when the bearing was not operating.

In the self-oiling bearing structures which were later developed the oil supply is kept below the rotating shaft and brought up gradually either by the well known ring oiling method or by the wick method. In either case the oil is brought from the reservoir and applied by the ring or by the wick directly to the rotating parts.

There is still another class of bearings denominated oilless bearings. To this class belongs the wood oilless bearing the wood of which is impregnated with all the oil that it can be made to retain, and the metal oilless bearing in which the bearing material is a mixture of powdered metal and graphite compressed under heavy pressure into a solid bearing sleeve. In this class of bearings the bearing sleeve itself is intended to contain all the lubricant which it will require during the life of the bearing.

But a wood bearing cannot be made to absorb enough oil to adequately lubricate it during its entire life, nor may powdered metal be mixed with enough graphite to lower its coefficient of friction to where it should be without producing a material which is too weak for a bearing sleeve.

An improved bearing structure in which all of the foregoing objections are overcome, in its broadest aspect, comprises a bearing structure containing a closed chamber into which a supply of lubricant sufficient for the life of the bearing is put when the bearing is made, which oil can only get to the surface which is to be lubricated by filtration through the very slightly porous metal of which the bearing itself is composed.

In Figs. 1 to 4 the simplest form in which this invention may be practiced is disclosed. The shell 20 comprises a body 21 having two axially extending hubs 22 with openings 23 and is preferably drawn from sheet metal such as steel or brass, either stamped in halves and welded, or made by expanding a single shell within a split die by the well known hydraulic process.

The bearing sleeve 24 having the shaft opening 26 is composed of a very slightly porous or absorptive material through which oil may percolate very slowly and in some cases only when the material of the sleeve is slightly warmed. A sleeve of highly compressed powdered bronze with a graphite content kept low enough to give the sleeve the proper strength is suitable.

The shell 20 and the sleeve 24 are assembled as shown in Fig. 3, the shell 20 being held in the base 27 while the sleeve 24 is forced by pressure through the upper hub 22 of the shell by means of the press member 28. Before the sleeve 24 is forced any further downwardly the shell and sleeve are filled with the lubricant 29 as shown. This lubricant may conveniently be brought in through the central opening 31 of the press member 28.

The sleeve 24 is now forced home in the shell 20 the surplus lubricant being caught in the pan 32. When removed from the press the bearing structure is complete as shown at 33, Fig. 4. This bearing is suitable for vertical mounting, or for a portable mechanism, or one in which the bearing gets turned in different positions.

Where a bearing is to be used in a fixed horizontal position an inexpensive part 34, Fig. 5 may be added. Part 34 comprises a short length of tubular wicking, preferably of a diameter half way between that of the outside of the sleeve and the inside of the shell which is placed within the shell 20 before the sleeve 24 is pressed into place. A bearing for fixed horizontal mounting having the wick 34 within the shell 20 around the sleeve 24 is shown at 36, Fig. 6.

No care need be taken in assembling the bearing 36 to get any particular side of the bearing upward inasmuch as the wick 34 being of larger diameter than the sleeve 24 the wick will always assume the position shown, that is, a position with one side of the wick resting on the top of the sleeve and the other side extending to the bottom of the shell. By this arrangement all of the oil is eventually brought to the sleeve even though the bearing is employed in a fixed horizontal position.

Fig. 7 shows a bearing 36 horizontally mounted in a machine frame 37. In such a mounting it may be desirable to make the hole 26 of the sleeve 24 correspond in diameter with the inside, and the bore 38 of the frame 37 correspond to the outside of a standard ball bearing, so that this improved bearing structure will interchange with ball bearings without alteration of the frames.

Fig. 8 shows a bearing 39 having a somewhat different shell 41 wherein the sleeve 20 is supported in hubs 42 which are turned inwardly instead of outwardly as in the other examples shown. Bearing 39 may be preferred where greater length is desired on the outside of the shell as where a single instead of a pair of bearings is used and great rigidity as between the bearing and the frame into which it is to be fitted is desired.

Fig. 9 shows a sleeve 24 supported in a shell 43 which has a spherical outer surface 44 which adapts it to a self-aligning mounting such as is shown in Fig. 10, where a machine hub 46 has a spherical inside 47 and an adjustable nut 48 also having a spherical inside surface 49. By proper adjustment of nut 49 freedom of movement of the bearing is permitted for self-alignment.

In the larger sizes in which this bearing may be made it may not be desirable to employ a pressed sheet metal shell to support the bearing sleeve. In Fig. 11, there is shown a structure in which a sleeve 24 is pressed directly into a non-rotatable machine hub 51. This structure is intended to remain non-rotatable and in a horizontal position and in order that substantially all of the oil supply may be used without the employment of a wick, the sleeve 24 is placed closer to the bottom of the hub than the top leaving only the slight space 52 below the sleeve 24 which may ultimately contain a small amount of oil which cannot come in contact with the sleeve. In this structure threaded plugs 53 are provided so that the oil supply may be renewed in case it runs out before the sleeve 24 is worn out. The sleeve 24 itself may of course be pressed from the machine hub and a new one fitted where the original one becomes worn.

Fig. 12 shows this invention applied to a line-shaft bearing. Here the cast shell 54 has the usual hubs 56 which contain the spherical surfaces 57 upon which the ends of the vertical screws 58 of a line shaft hanger bear. A heavy web 59 prevents distortion of the hub due to the pressure of screws 58. A hole 61 connects the two oil chambers 62. Wicks 63 are employed to raise the oil when it becomes low and filler plugs 64 are provided whereby the oil may be replenished when exhausted.

In Fig. 13 there is shown a vertical bearing structure wherein a bearing head 66 has spaced apart hubs 67 with a single sleeve 24 long enough to extend through both bushings. To provide two spaced apart bearings in the single bushing, the shaft 68 may be relieved at its middle as at 69, or, as an alternative, the sleeve may be internally relieved for the same length. The lubricant chamber 71 surrounds the middle part only of the sleeve 24 where the shaft has no bearing. A filler plug 72 is provided for chamber 71. In the bearing structure Fig. 13 the lubricant is fed to the bearings somewhat more slowly than in the other examples shown, and, because of the fact that the supply of lubricant is applied to the sleeve 24 at a somewhat greater distance from the ends, there is added assurance that no unused lubricant will reach the outer ends of the bearings since the lubricant absorbed by the middle portion of the sleeve 24 must be carried a greater distance by capillary attraction than in the single bearing structure shown. The fact that no surplus lubricant reaches the outer ends of the bearings makes this structure particularly applicable to small motors for operating food mixers.

The bearing structure shown in Fig. 14 is intended to illustrate how a machine member may have rotative bearing on the outside of a porous bearing sleeve 24. Here the lubricant 29 is contained within the bearing sleeve and percolates through and to the outside of the sleeve upon which the rotatable member turns. The frame 73 supports the sleeve 24, the outer end of the sleeve being closed by the plate 76, all held together and against rotation by the bolt 77. The rotatable member 78 then operates freely around the outside of the sleeve 24. A filler plug 79 may be provided as in some of the structures shown.

Fig. 15 shows an application of this invention to a reciprocating machine member. Here a reciprocating member 81 has a plate 82 secured oil tight to the bottom of the member, the plate being composed of the same material as the bearing sleeves 24. The member 81 is hollow thereby leaving a chamber for the lubricant 29 which is in constant contact with the absorptive plate 82. Gibs 83 guide the movement of the plate 82 and hold it in slidable contact with the base 84. A filler plug 86 is provided for replenishing the lubricant 29.

While in the foregoing description and drawing there are shown rotative bearings in which the chamber which holds the lubricant completely surrounds the bearing sleeve but it will be apparent that such a chamber may extend partway only around the sleeve, the essential elements of the invention consisting of a slightly porous bearing member, a leak-proof lubricant chamber which will contain a relatively large supply of lubricant and hold it in contact with one surface of the bearing member in such a way that not the slightest particle of the lubricant may get out of the chamber except by being absorbed by the bearing sleeve and carried by capillary attraction through the material of the sleeve to another surface thereof upon which a moving member bears. Such a principle is applicable to reciprocating as well as rotative bearings.

Having described this invention, the following claim is made:

The combination in a bearing structure of a hollow shell, enclosing ends in said shell, said enclosing ends having bearing sleeve openings extending therethru, a bearing sleeve of oil pervious material fitted oil tight in said openings and extending through said shell, a rotatable shaft extending through said sleeve, said shaft having clearance in that portion of said sleeve which is within the interior of said shell and rotative bearing in the remaining portion of said sleeve, and a supply of oil in said shell in contact with the outside of that portion only of said sleeve within which said shaft has said clearance.

HERBERT F. APPLE,
*Executor for the Estate of Vincent G. Apple, Deceased.*